Sept. 18, 1962 S. R. SHOOK 3,054,957
REMOTE CONTROL APPARATUS
Filed Aug. 3, 1959
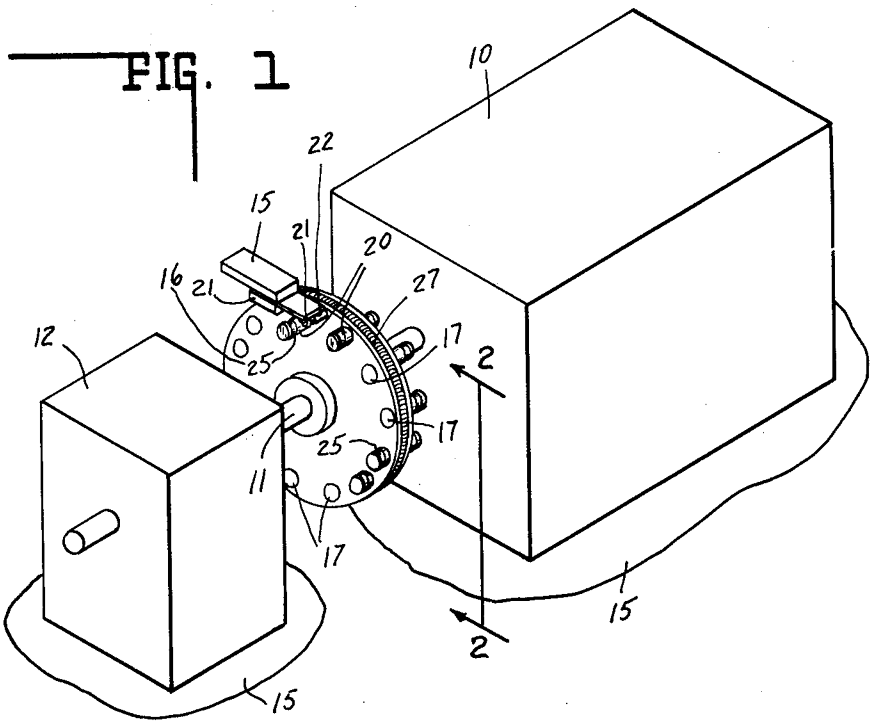
FIG. 1
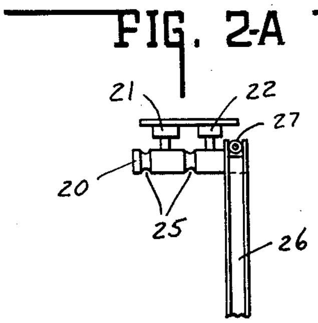
FIG. 2-A
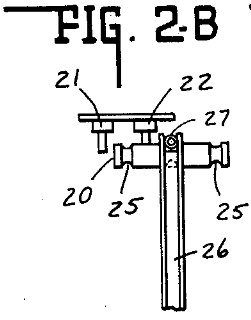
FIG. 2-B
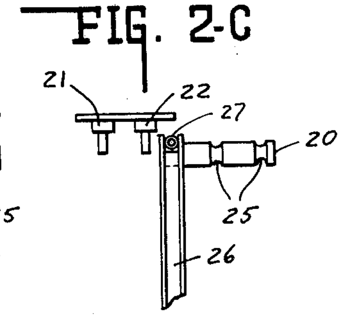
FIG. 2-C
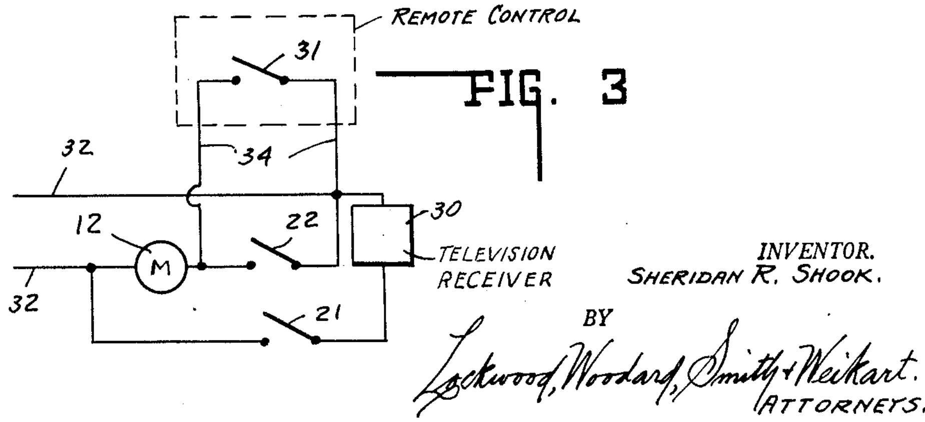
FIG. 3
INVENTOR.
SHERIDAN R. SHOOK.
BY
Lockwood, Woodard, Smith & Weikart.
ATTORNEYS.

3,054,957
Patented Sept. 18, 1962

1

3,054,957
REMOTE CONTROL APPARATUS

Sheridan R. Shook, Fort Wayne, Ind., assignor to The Magnavox Company, Fort Wayne, Ind., a corporation Filed Aug. 3, 1959, Ser. No. 831,385
4 Claims. (Cl. 325—393)

The present invention relates to a positioning device and to remote control apparatus for a television receiver.

One of the problems related to operation of present day television receivers is that in order to change the channel or turn the receiver off and on, it is necessary to manually operate a knob on the set. It is desirable that remote control means be provided for performing these functions whereby a viewer, who is located remotely from the receiver, may operate the tuner, the volume control, and other control devices.

It is therefore an object of the present invention to provide a device for remote control of a television receiver.

A further object of the present invention is to provide improved means for selectively positioning a rotatable element.

Another object of the invention is to provide an economical, reliable device for remote control of a television receiver.

Still another object of the present invention is to provide a selective device for remote control of a television receiver, said device being adjustable at will to change the channels to which the receiver may be tuned.

Further objects and advantages will become apparent as the description proceeds.

In accordance with the present invention, there is provided a motor connected to an element for the rotation thereof. A switch is arranged in series with the motor for controlling power to the motor, the switch being biased to closed position and actuatable to open position. A plurality of switch actuating members are mounted upon the element and are each spaced equally from the axis of the element. The switch is positioned for actuation by the members as the element rotates. There is also provided a second switch in parallel with the first mentioned switch for starting operation of the motor.

The full nature of the invention will be understood from the accompanying drawings and the following description and claims:

FIG. 1 is a perspective view of remote control apparatus embodying the present invention.

FIGS. 2–A, 2–B and 2–C are fragmentary side elevation views taken along the line 2—2 and in the direction of the arrows of FIG. 1 and show the apparatus in various operating positions.

FIG. 3 is a schematic electrical diagram of the electrical circuit of the apparatus of FIG. 1.

Referring now to the drawings, this invention comprises a television channel selecting tuner 10 which may be tuned conventionally by a manually operated knob (not shown) mounted upon a shaft 11. The tuner 10 and an electric motor 12 are both mounted upon the chassis 15 of the television receiver. The motor 12 is coupled to the shaft 11 in such a manner that the motor can drive the shaft 11 and rotate it to various angular positions for selecting channels.

A wheel or disc 16 is mounted upon the shaft 11, coaxially thereof, for rotation therewith. The wheel 16 has a plurality of bores 17 which extend axially of the wheel and have received therein a plurality of cylindrical elongated pins 20.

A pair of switches 21 and 22, are mounted upon the chassis 15 of the set in such a position that when the

2 wheel is rotated by the motor 12, the pins 20 may actuate the switches 21 and 22. Referring to FIGS. 2–A, 2–B and 2–C, both of the switches 21 and 22 will be actuated by a respective pin when that pin is in the position of FIG. 2–A, only switch 22 will be actuated when that pin is in the position of FIG. 2–B and neither of the switches 21 and 22 will be actuated when the pin is in the position of FIG. 2–C.

Each of the pins is provided with three peripheral grooves 25. The wheel 16 has a peripheral groove 26 within which is received a looped or closed tension spring 27. Groove 26 is deep enough to open into the bores 17 whereby spring 27 engages the pins 20 and acts as a detent to retain the pins within the particular position in which they are placed. As can be seen from FIGS. 2–A, 2–B or 2–C, the bores 17 intersect the recess 26 and therefore, the spring 27 will be resiliently received within one of the grooves 25 when the pins are in any of the positions illustrated in FIGS. 2–A—2–C. The pins 20 may be easily readjusted to a different one of the positions by merely exerting axial pressure thereon.

Referring now to FIG. 3, the electrical circuit of the device will be described in connection with the operation of the device. The television receiver, itself, is indicated by the numeral 30 and is arranged in parallel with the motor 12. Switches 21 and 22 are normally biased to closed position but may be actuated to open position by being engaged by one of the pins 20 as the wheel rotates. A remote control switch 31 may be mounted within a suitable box (not shown) positioned remotely from the television receiver and connected in electrical parallel with the switch 22 by a pair of conductors 34 in cable form.

In operation, the viewer predetermines those channels to be selected by the tuner 10 by inserting a number of pins 20 in those bores 17 corresponding to the channels which are available in his particular area or which he desires to observe. Referring to FIGS. 2–A, 2–B and 2–C, any one of the pins 20 may be positioned as shown in FIG. 2–A in order to provide at least one position of wheel 16 wherein switch 21 will be operated to disconnect the television receiver. The remaining channel selecting pins may be positioned as illustrated in FIG. 2–B to effect channel selection. Those pins corresponding to blank or undesired channels may be positioned as illustrated in FIG. 2–C.

In order to operate the apparatus, power is provided across the lines 32—32 from a commercial source. Assuming that the receiver is turned off, the wheel will be in a position in which both of the switches 21 and 22 are held open by one of the pins 20. The switch 31 is closed from a remote point by the viewer in order to start operation of the motor 12. Preferably, only one of the pins 20 will be in the extreme position of FIG. 2–A and therefore, as the motor 12 begins to rotate the wheel 16, the switch 21 will be closed, turning on the receiver until such time as the wheel makes a complete 360 degree rotation and the set is again turned off. Simultaneously the switch 22 will also be closed, connecting and maintaining power to the motor 12 even though the switch 31 is allowed to open. The motor will continue to rotate until the switch 22 is engaged by a pin in the position illustrated in FIG. 2–B. Only the switch 22 will be opened and the motor will stop shaft 11 at a particular angular position representing a desired channel. Switch 21 will remain closed to hold the television receiver in energized condition for receiving and reproducing pictures.

In order to select different channels, this operation is repeated by momentarily closing switch 31 causing the shaft 11 to be stepped around through various angles of rotation, each of which represents a desired channel.

In the case that the viewer does not desire that a particular channel be in the program of the apparatus or in the case that there is no station assigned to a particular channel, that angular position may have its pin 20 in the position of FIG. 2–C and the channel will be bypassed.

While the invention has been described in some detail in the drawings in the foregoing description, they are to be considered as illustrative and not restrictive in character as modifications within the broad scope of the invention may readily suggest themselves to persons skilled in this art, reference being to the appended claims.

The invention claimed is:

1. A remote control device for communications apparatus comprising a channel selecting tuner, an operating shaft extending from said tuner and positionable at various angles of rotation for selecting channels, a motor operatively connected to said shaft for rotation thereof, a wheel mounted on said shaft coaxially thereof for rotation therewith, a plurality of pins mounted upon said wheel, a switch arranged in series with the motor for controlling power thereto, a second switch arranged in series with said apparatus for controlling power to said apparatus, said switches being biased to closed position and actuatable to open position, said switches being mounted on said apparatus adjacent said wheel, each of said pins being movable with respect to said wheel between positions wherein they actuate neither, one or both of said switches as said wheel rotates, and a third switch located remotely of said apparatus and arranged in parallel with said first mentioned switch for starting operation of said motor.

2. A remote control device for communications apparatus comprising a channel selecting tuner, an operating shaft extending from said tuner and positionable at various angles of rotation for selecting channels, a motor operatively connected to said shaft for rotation thereof, a wheel mounted on said shaft coaxially thereof for rotation therewith, a plurality of pins mounted upon said wheel, a switch arranged in series with the motor for controlling power thereto, a second switch arranged in series with said apparatus for controlling power to said apparatus, said switches being biased to closed position and actuatable to open position, said switches being mounted on said apparatus adjacent said wheel, each of said pins being movable with respect to said wheel between positions wherein they actuate neither, one or both of said switches as said wheel rotates, a third switch located remotely of said apparatus and arranged in parallel with said first mentioned switch for starting operation of said motor, said wheel having a peripheral recess, a tension spring in the form of a loop resiliently received in said recess, said wheel having a plurality of bores which extend axially and intersect said recess, each of said pins being received in respective ones of said bores, each of said pins having three indentations spaced along their length, said indentations being so located that, when said spring is received in one of said indentations, said pin is in a first of said positions, when said spring is received in a second of said indentations, said pin is in a second of said positions and, when said spring is received in a third of said indentations, said pin is in a third of said positions.

3. A remote control device for a television receiver comprising a channel selecting tuner, an operating shaft extending from said tuner and positionable at various angles of rotation for selecting channels, a motor operatively connected to said shaft for rotation thereof, a wheel mounted on said shaft coaxially thereof for rotation therewith, a plurality of pins mounted upon said wheel in a circular pattern coaxial with the axis of said wheel, a switch arranged in series with the motor for controlling power thereto, a second switch arranged in series with said television receiver for controlling power to said receiver, said switches being biased to closed position and actuatable to open position, said switches being mounted on said receiver adjacent said wheel, each of said pins being movable with respect to said wheel between positions wherein they actuate neither, one or both of said switches as said wheel rotates, and a third manually operable switch located remotely of said receiver and arranged in parallel with said first mentioned switch for starting operation of said motor.

4. A remote control device for communications apparatus comprising a station selecting tuner positionable at various angles of rotation for selecting stations, a motor operatively connected to said tuner for rotation thereof, an element fixed with relation to said tuner for rotation therewith, a plurality of pins mounted upon said element in a circular pattern coaxial with the axis of rotation of said element, a switch arranged in series with the motor for controlling power thereto, a second switch arranged in series with said apparatus for controlling power to said apparatus, said switches being biased to closed position and actuable to open position, said switches being mounted on said apparatus adjacent said element, each of said pins being movable with respect to said element between positions wherein they actuate neither, one or both of said switches as said element rotates, and a third switch located remotely of said receiver and arranged in parallel with said first mentioned switch for starting operation of said motor.

References Cited in the file of this patent

UNITED STATES PATENTS

| | | |
|---|---|---|
| 2,755,424 | Papitte | July 17, 1956 |
| 2,805,379 | Troeller et al. | Sept. 3, 1957 |
| 2,833,976 | Kennedy et al. | May 6, 1958 |
| 2,852,727 | Barnett | Sept. 16, 1958 |
| 2,897,354 | Bourget et al. | July 28, 1959 |
| 2,965,829 | Lingenbrink et al. | Dec. 20, 1960 |